US012748671B2

(12) United States Patent
Lee et al.

(10) Patent No.: US 12,748,671 B2
(45) Date of Patent: Sep. 29, 2026

(54) METHOD FOR INJECTING FAULT WITH VARIABLE POWER SUPPLY AND APPARATUS THEREFOR

(71) Applicant: ELECTRONICS AND TELECOMMUNICATIONS RESEARCH INSTITUTE, Daejeon (KR)

(72) Inventors: Jin-Yong Lee, Daejeon (KR); Myeong-Hyun Kim, Daejeon (KR); Jung-Chan Na, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 19/090,773

(22) Filed: Mar. 26, 2025

(65) Prior Publication Data

US 2026/0220010 A1 Jul. 30, 2026

(30) Foreign Application Priority Data

Dec. 31, 2024 (KR) ........................ 10-2024-0201528

(51) Int. Cl.
*G06F 11/263* (2006.01)

(52) U.S. Cl.
CPC .................................. *G06F 11/263* (2013.01)

(58) Field of Classification Search
CPC ............................ G06F 11/261; G06F 11/263
USPC ..................................................... 714/32, 41
See application file for complete search history.

(56) References Cited

U.S. PATENT DOCUMENTS

| | | | | |
|---|---|---|---|---|
| 9,523,737 | B2 | 12/2016 | O'Flynn | |
| 2010/0287412 | A1 | 11/2010 | Cha et al. | |
| 2015/0293827 | A1 | 10/2015 | Han et al. | |
| 2017/0213585 | A1 | 7/2017 | Schoenborn et al. | |
| 2023/0133042 | A1* | 5/2023 | Whiteford ............ | G01R 31/343 324/765.01 |
| 2025/0252024 | A1* | 8/2025 | Margalit ............... | G06F 11/008 |

FOREIGN PATENT DOCUMENTS

| | | | | | |
|---|---|---|---|---|---|
| CN | 107861005 | A | | 3/2018 | |
| CN | 215867583 | U | * | 2/2022 | |
| CN | 114995347 | A | * | 9/2022 | ......... G05B 23/0262 |
| CN | 117370094 | A | | 1/2024 | |
| KR | 10-2011-0044530 | A | | 4/2011 | |
| KR | 10-2012-0055218 | A | | 5/2012 | |
| KR | 102269546 | B1 | * | 6/2021 | .......... G06F 11/3058 |

* cited by examiner

*Primary Examiner* — Chae M Ko
(74) *Attorney, Agent, or Firm* — Sughrue Mion, PLLC

(57) ABSTRACT

Disclosed herein are a method for fault injection with a variable power supply and an apparatus for the same. The method, performed by the apparatus for fault injection, includes controlling the voltage level of an external supply voltage using a voltage converter; controlling the output of a converted voltage, output from the voltage converter, using an output control switch; and injecting a fault into the converted voltage using a fault control switch.

19 Claims, 5 Drawing Sheets

METHOD FOR INJECTING FAULT WITH VARIABLE POWER SUPPLY AND APPARATUS THEREFOR

CROSS REFERENCE TO RELATED APPLICATION

This application claims the benefit of Korean Patent Application No. 10-2024-0201528, filed Dec. 31, 2024, which is hereby incorporated by reference in its entirety into this application.

BACKGROUND OF THE INVENTION

1. Technical Field

The present disclosure relates generally to technology for supplying power and injecting faults for embedded systems, and more particularly to technology for a new type of power management system that integrates a variable power supply and a fault injection controller into a single device to perform attacks for disrupting the operation of a system or inducing abnormal operations through fault injection.

2. Description of the Related Art

Fault injection attacks are one of important techniques in the field of hardware security analysis and are widely used as methods for analyzing security vulnerabilities by disrupting normal operations of embedded systems and other digital systems or causing abnormal faults in the systems. Fault injection may be performed in various manners, including voltage fluctuations, electromagnetic interference, clock glitches, and the like, and particularly, voltage fault injection is attracting attention as a direct and efficient attack technique against embedded systems.

Existing voltage fault injection systems usually require an external power supply device and a separate fault injection device. Most of the systems operate in such a way that, while a power supply device supplies a constant voltage to the system, an additional device changes the voltage or injects a fault signal. This method requires a complex installation process due to interconnection between separate devices and requires multiple hardware devices, which results in inefficient space utilization and increased costs.

DOCUMENTS OF RELATED ART (Patent Document 1) Korean Patent Application Publication No. 10-2011-0044530, published on Apr. 29, 2011 and titled "Fault injection test apparatus and fault injection test method using simulation kernel for evaluation of reliability of embedded system".

SUMMARY OF THE INVENTION

An object of the present disclosure is to integrate a fault injection function into a power supply device itself, thereby performing power supply and fault injection in a single device.

Another object of the present disclosure is to more conveniently perform security evaluation and vulnerability analysis in small electronic systems, such as embedded systems, by supplying different voltage levels required by an embedded system and simultaneously injecting a fault signal with precise timing when necessary.

A further object of the present disclosure is to perform more efficient security analysis and system tests without separate device installation or a complex connection.

Yet another object of the present disclosure is to more efficiently perform security evaluation and vulnerability analysis in a system by supplying different voltage levels required by an embedded system and simultaneously injecting a fault signal with precise timing when necessary.

In order to accomplish the above objects, a fault injection method, performed by a fault injection apparatus, according to the present disclosure includes controlling the voltage level of an external supply voltage using a voltage converter, controlling the output of a converted voltage, output from the voltage converter, using an output control switch, and injecting a fault into the converted voltage using a fault control switch.

Here, the fault injection method may further include supplying, by the fault injection apparatus, the converted voltage into which the fault is injected to a fault injection target device.

Here, the voltage converter may convert the external supply voltage to correspond to a variable voltage control signal input from a user, thereby outputting the converted voltage.

Here, the fault control switch may be turned on to correspond to a fault control signal input from a user.

Here, injecting the fault may comprise changing the output waveform of the converted voltage based on a fault injection output interface whenever the fault control switch is turned on.

Here, injecting the fault may comprise changing the output waveform to correspond to a preset fault waveform parameter.

Also, a fault injection apparatus according to an embodiment of the present disclosure includes a voltage converter for controlling the voltage level of an external voltage, an output control switch for controlling the output of a converted voltage output from the voltage converter, and a fault control switch for injecting a fault into the converted voltage.

Here, the converted voltage into which the fault is injected may be supplied to a fault injection target device.

Here, the voltage converter may convert the external voltage to correspond to a variable voltage control signal input from a user, thereby outputting the converted voltage.

Here, the fault control switch may be turned on to correspond to a fault control signal input from a user.

Here, the output waveform of the converted voltage may be changed based on a fault injection output interface whenever the fault control switch is turned on.

Here, the output waveform may be changed to correspond to a preset fault waveform parameter.

Also, a fault injection method, performed by a fault injection apparatus, according to an embodiment of the present disclosure includes determining whether an external voltage is supplied, controlling the voltage level of the external voltage using a voltage converter when the external voltage is supplied, controlling the output of a converted voltage output from the voltage converter using an output control switch, and injecting a fault into the converted voltage using a fault control switch.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
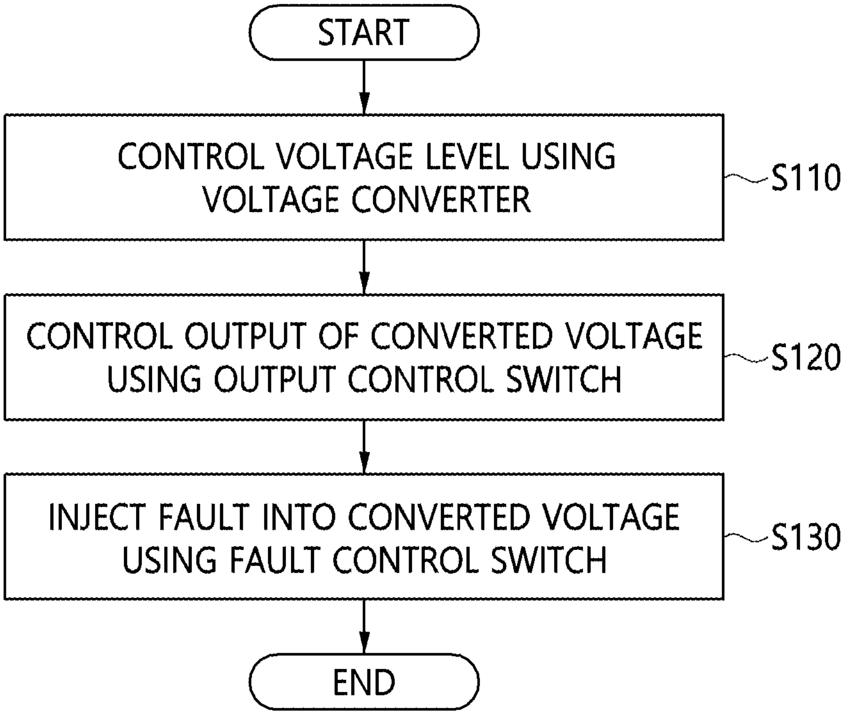
FIG. 1 is a flowchart illustrating a method for fault injection with a variable power supply according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Hereinafter, a preferred embodiment of the present disclosure will be described in detail with reference to the accompanying drawings.

FIG. 1 is a flowchart illustrating a method for fault injection with a variable power supply according to an embodiment of the present disclosure.

Referring to FIG. 1, in the method for fault injection with a variable power supply according to an embodiment of the present disclosure, a fault injection apparatus controls the voltage level of an external supply voltage using a voltage converter at step S110.

Figure 2:
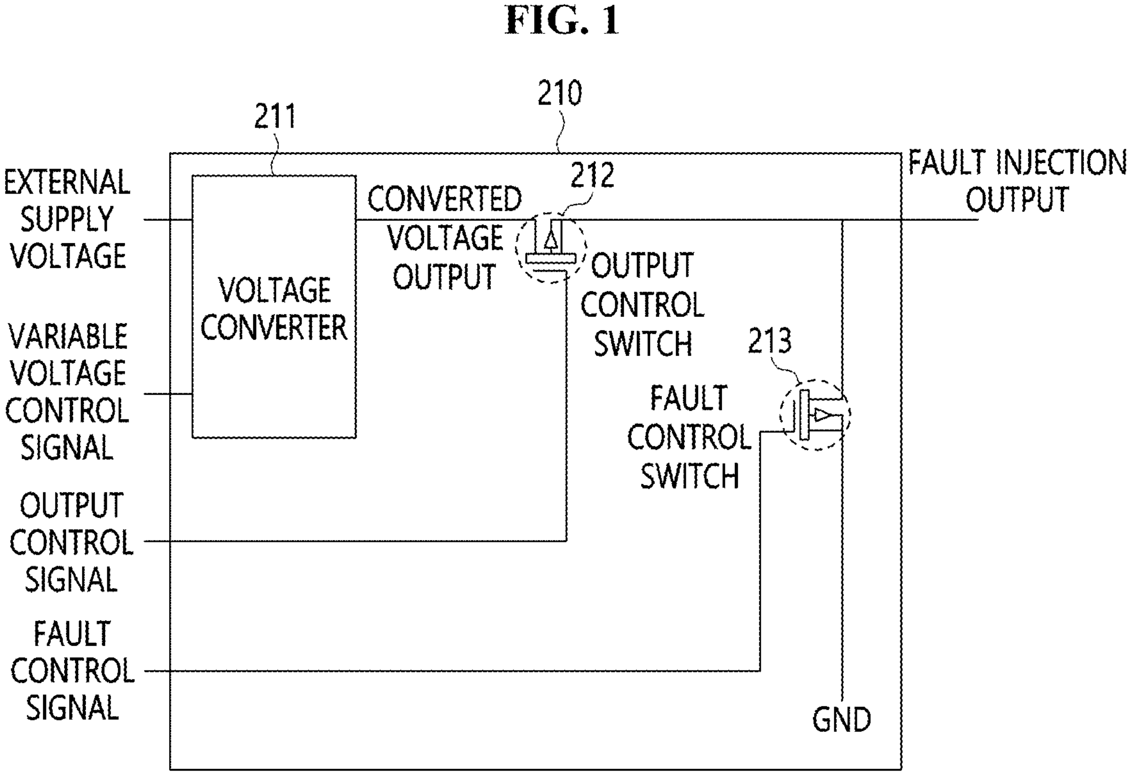
FIG. 2 is a view illustrating an apparatus for fault injection with a variable power supply according to an embodiment of the present disclosure.

For example, FIG. 2 illustrates a fault injection apparatus 210 according to an embodiment of the present disclosure, and unlike an existing form in which an external power supply function and a fault injection function are separated, it is designed such that a power supply function and a fault injection function can be performed in a single device by integrating the power supply function and the fault injection function.

Here, the voltage converter 211 may function to convert the voltage supplied from the outside into the voltage desired by a user.

Here, the voltage converter converts the external voltage to correspond to a variable voltage control signal input from the user, thereby outputting a converted voltage.

For example, the voltage converter 211 may receive the external voltage and the variable voltage control signal, as illustrated in FIG. 2.

Here, the external voltage is the voltage that is usually supplied through a power outlet, and may correspond to the starting point of the voltage to be finally supplied to an embedded device.

Here, the variable voltage control signal may play a role in controlling the voltage converter 211 to convert the external voltage to the accurate voltage level required by the embedded device and output the same. The variable voltage control signal may be analog (e.g., control based on variable resistance) or digital (e.g., control through a specific type of digital communication), and the output of the converted voltage may be determined depending on this signal. The output level of the converted voltage may also be controlled during the operation of the embedded device.

Also, in the method for fault injection with a variable power supply according to an embodiment of the present disclosure, the fault injection apparatus controls the output of the converted voltage, output from the voltage converter, using an output control switch at step S120.

Here, the output control switch corresponds to the switch for determining whether the converted voltage, which is the output of the voltage converter, will be output to a fault injection output interface, and may be implemented in the form of an analog switch or a digital switch.

For example, the output control switch 212 illustrated in FIG. 2 may be controlled by a user. When the output control switch 212 is turned on, the output is enabled, whereby the converted voltage may be supplied normally to the embedded device through the fault injection output interface. Conversely, when the output control switch 212 is turned off, the connection with the output is disconnected, and the fault injection output interface may be connected to only a fault control switch 213.

In the method for fault injection with a variable power supply according to an embodiment of the present disclosure, the fault injection apparatus injects a fault into the converted voltage using the fault control switch at step S130.

Here, the fault control switch may be turned on to correspond to a fault control signal input from the user.

For example, the user may select whether to turn on or off the fault control switch 213 illustrated in FIG. 2.

Here, whenever the fault control switch 213 is turned on, the output waveform of the converted voltage may be changed based on the fault injection output interface.

Here, the output waveform may be changed to correspond to a preset fault waveform parameter.

That is, the fault control switch is a switch for determining the shape of the waveform of the output to the fault injection output interface, and may be implemented in the form of an analog switch or a digital switch.

For example, when the fault control switch 213 is turned on, the fault injection output interface is connected to GND, which may cause the output voltage to drop to GND. Conversely, when the fault control switch 213 is turned off, the converted voltage may be delivered to the fault injection output interface without change.

Generally, the user turns the fault control switch 213 on/off temporarily (for very short duration) to cause a sudden change in the output converted voltage, which leads to instability of the input voltage supplied to the embedded device connected to the fault injection output interface. As a result, an error is caused in the operation of the embedded device.

Also, although not illustrated in FIG. 1, in the method for fault injection with a variable power supply according to an embodiment of the present disclosure, the fault injection apparatus supplies the converted voltage into which the fault is injected to a fault injection target device.

Figure 3:
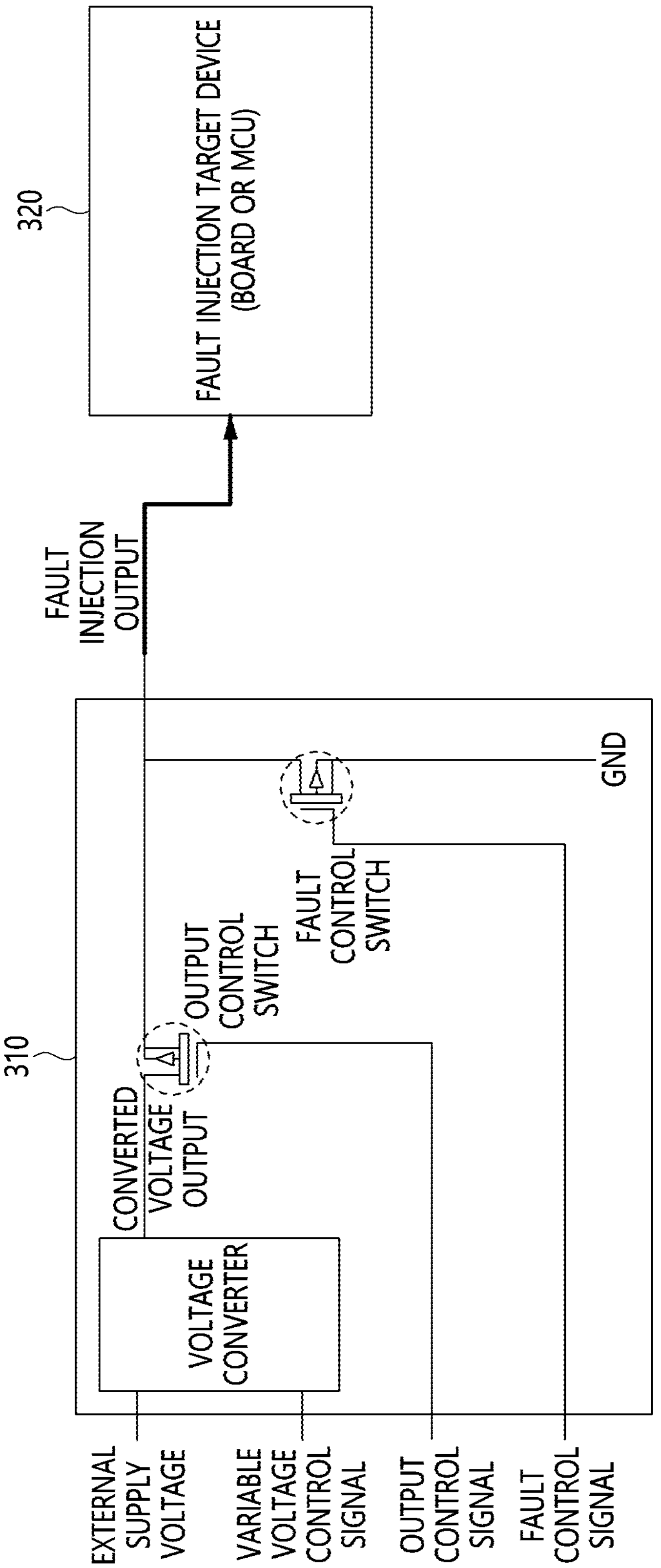
FIG. 3 is a view illustrating an example of outputting a fault-injected voltage to a target device through a fault injection apparatus according to the present disclosure.

For example, as illustrated in FIG. 3, a fault signal for a test may be more easily injected into the fault injection target device 320 using the fault injection apparatus 310.

Through the above-described method for fault injection with a variable power supply, a fault signal is injected while power is being supplied, whereby a fault injection environment suitable for security analysis and system vulnerability tests may be provided.

Also, in embedded systems and other digital devices, a system capable of supplying power and injecting faults may be provided without an external power supply device or a separate fault injection device.

Also, security evaluation and vulnerability analysis in a system may be more efficiently performed by supplying different voltage levels required by an embedded system and simultaneously injecting a fault signal with precise timing when necessary.

Also, a power supply function and a fault injection function are integrated, which may simplify installation and operation and enable cost reduction and flexible control.

Figure 4:
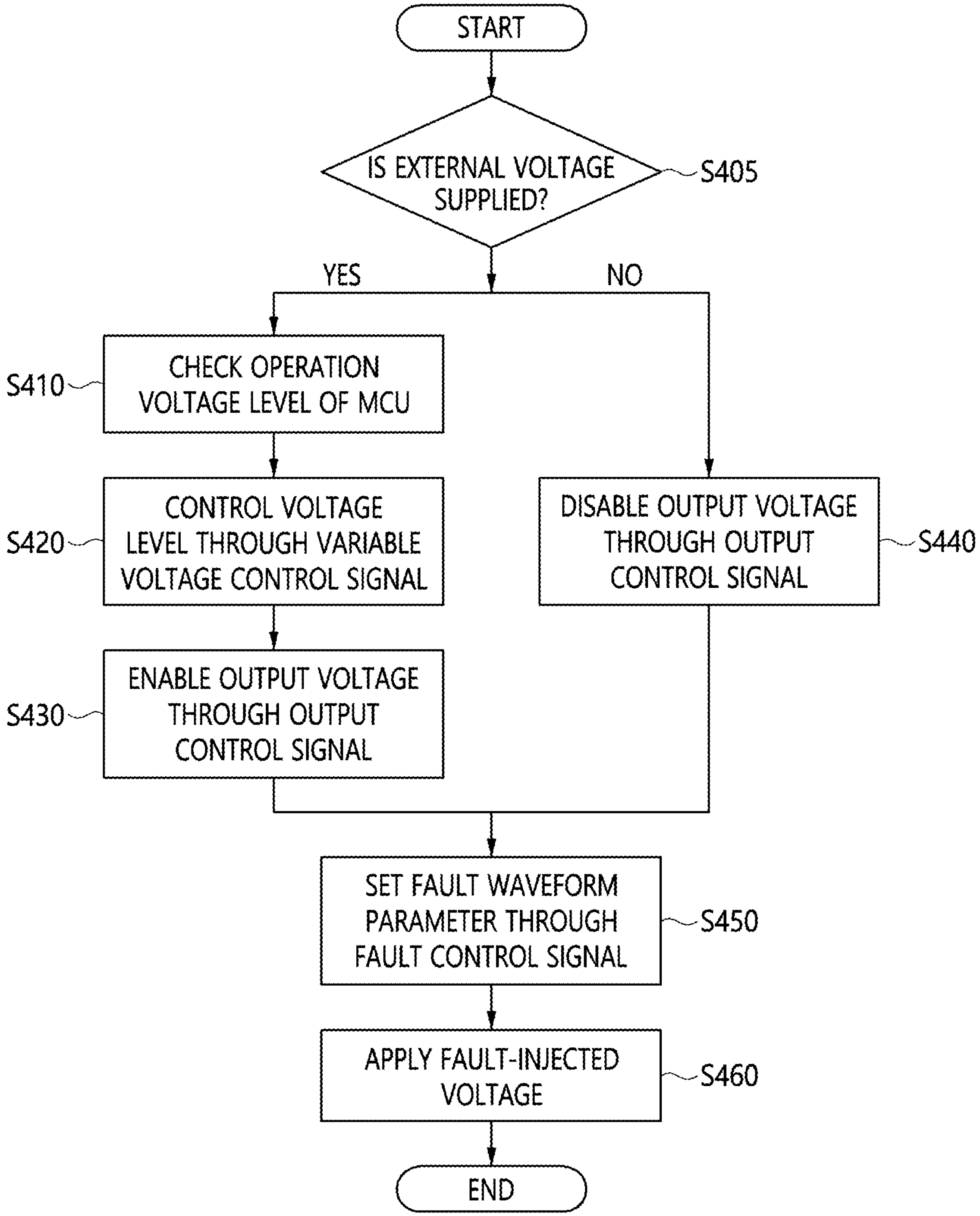
FIG. 4 is a flowchart illustrating a method for fault injection with a variable power supply according to another embodiment of the present disclosure.

FIG. 4 is a flowchart illustrating a method for fault injection with a variable power supply according to another embodiment of the present disclosure.

Referring to FIG. 4, the method for fault injection with a variable power supply according to another embodiment of the present disclosure may be used when the voltage of a fault injection target device (board or MCU) is supplied from the outside through a dedicated adapter or an external voltage supply and the supplied voltage is input to the MCU through an internal voltage divider in the board.

To this end, first, whether an external voltage is supplied to the fault injection target device may be determined at step S405.

When it is determined at step S405 that the external voltage is not supplied to the fault injection target device, the operation voltage level of the fault injection target MCU is checked at step S410, and the fault injection apparatus may perform voltage level control corresponding to the operation voltage level of the MCU through a variable voltage control signal at step S420.

Subsequently, the variable voltage output may be enabled using an output control signal at step S430.

Also, when it is determined at step S405 that the external voltage is supplied to the fault injection target device, the fault injection apparatus may disable the output voltage through an output control signal at step S440.

Subsequently, a fault waveform parameter may be set through a fault control signal at step S450, and a fault injection voltage may be applied at step S460.

Figure 5:
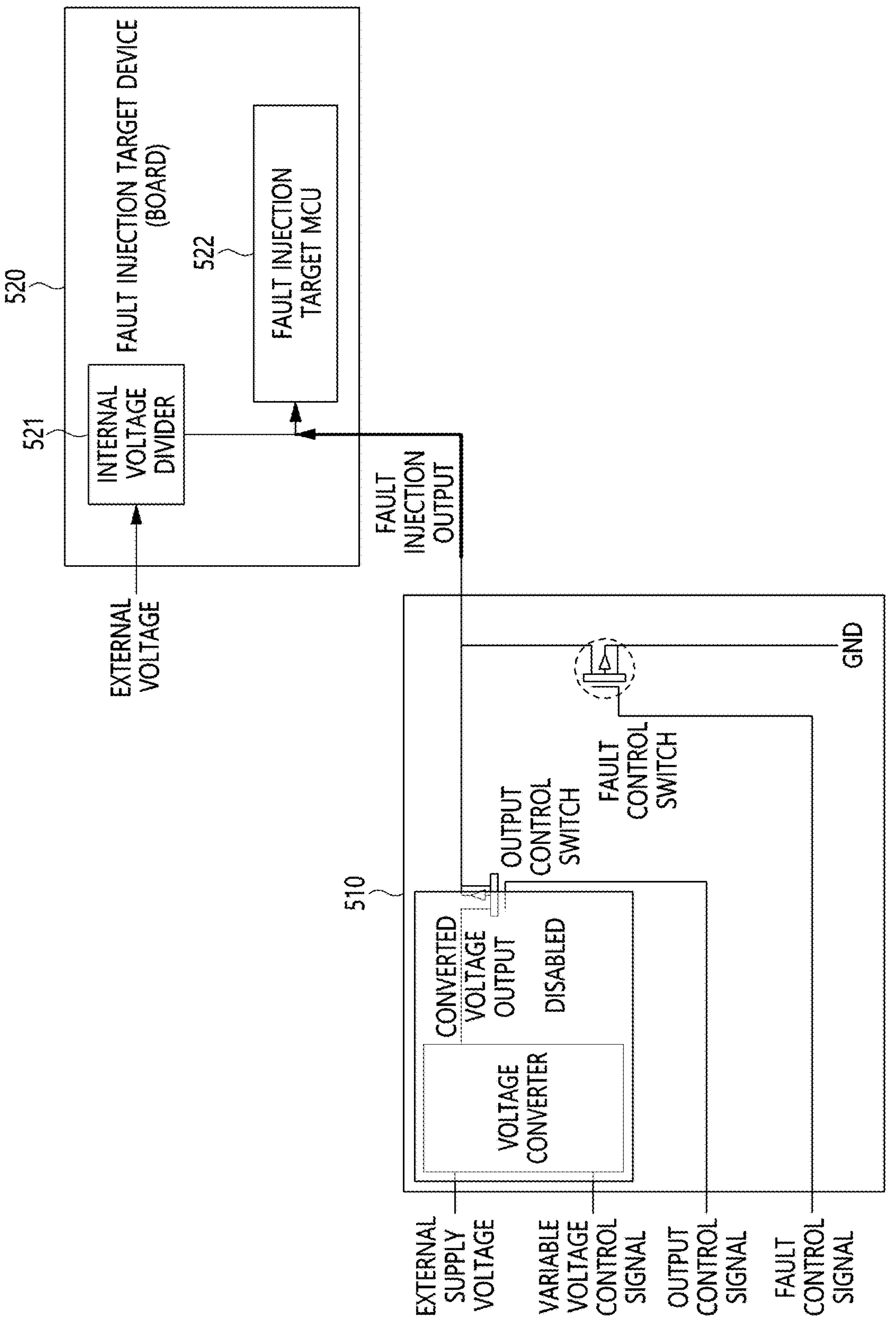
FIGS. 5 and 6 are views illustrating an example of performing only fault injection through a fault injection apparatus according to the present disclosure.

For example, as illustrated in FIG. 5, the output of a voltage converter may be interrupted by turning off the output control switch of a fault injection apparatus 510. As a result, the fault injection apparatus 510 may be connected to a voltage line in the form of an open collector/open drain, similar to a commonly used commercial fault injection device, and injecting a fault into a fault injection target device 520 may be performed using a fault control signal provided by a user.

Figure 6:
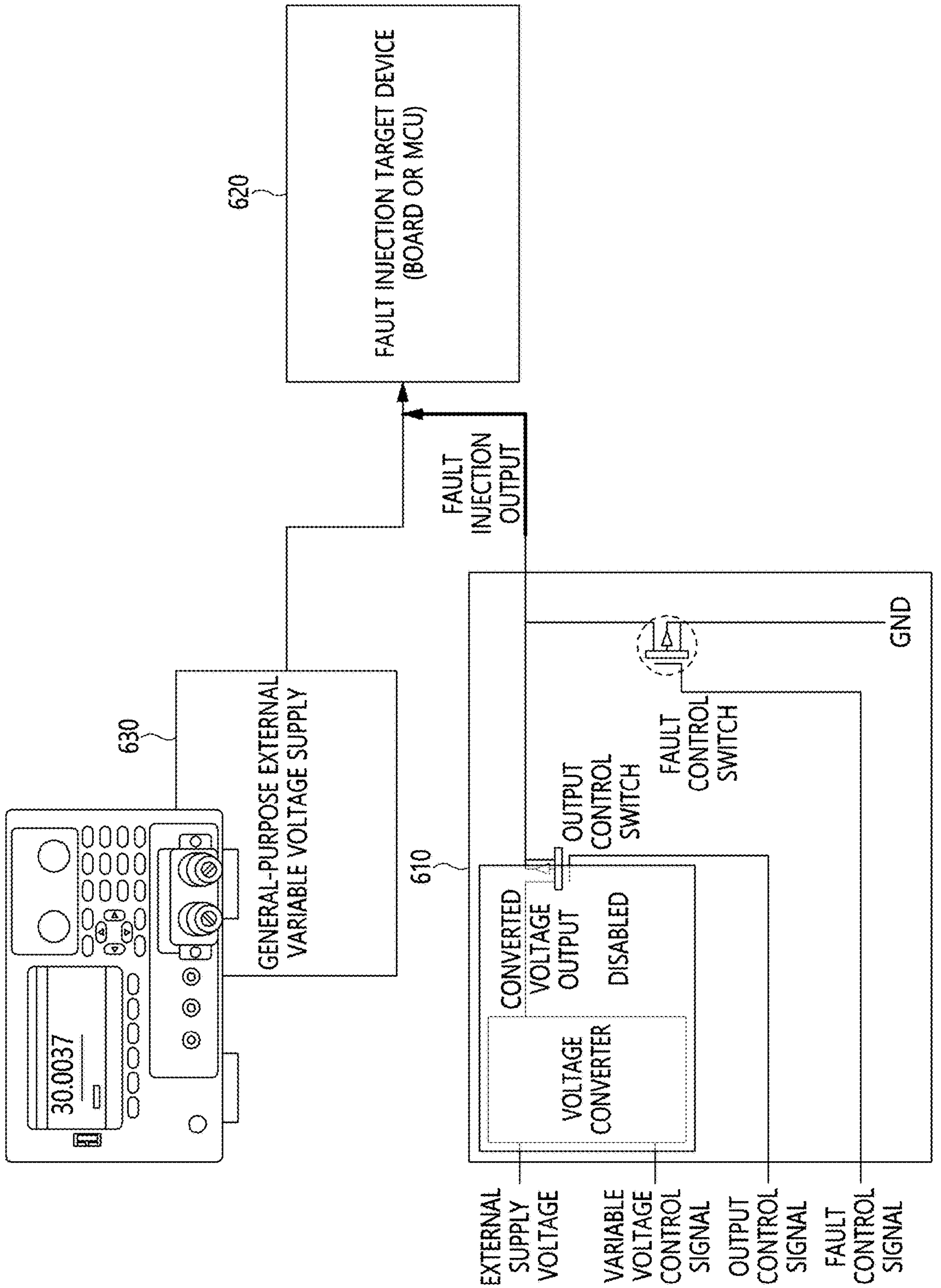

In another example, referring to FIG. 6, when an internal voltage divider is not used in a fault injection target device 620, a general-purpose external variable voltage supply 630 is generally used to supply a voltage corresponding to the voltage level of the MCU of the fault injection target device 620. When fault injection is required, a fault injection apparatus 610 may be connected in the form of an open collector/open drain to the voltage line through which the general-purpose external variable voltage supply 630 and the fault injection target device 620 are connected.

According to the present disclosure, a fault injection environment suitable for security analysis and system vulnerability tests may be provided by injecting a fault signal while power is being supplied.

Also, the present disclosure may provide a system capable of supplying power and injecting faults in embedded systems and other digital devices without an external power supply device and a separate fault injection device.

Also, the present disclosure may more efficiently perform security evaluation and vulnerability analysis in a system by supplying different voltage levels required by an embedded system and simultaneously injecting a fault signal with precise timing when necessary.

Also, the present disclosure integrates a power supply function and a fault injection function, thereby simplifying installation and operations and enabling cost reduction and flexible control.

As described above, the method for fault injection with a variable power supply and the apparatus for the same according to the present disclosure are not limitedly applied to the configurations and operations of the above-described embodiments, but all or some of the embodiments may be selectively combined and configured, so the embodiments may be modified in various ways.

What is claimed is:

1. A method for fault injection with a variable power supply, performed by a fault injection apparatus, comprising:

controlling a voltage level of an external supply voltage using a voltage converter;

controlling output of a converted voltage, output from the voltage converter, using an output control switch; and injecting a fault into the converted voltage using a fault control switch.

2. The method of claim 1, further comprising:

supplying, by the fault injection apparatus, the converted voltage into which the fault is injected to a fault injection target device.

3. The method of claim 1, wherein the voltage converter converts the external supply voltage to correspond to a variable voltage control signal input from a user, thereby outputting the converted voltage.

4. The method of claim 1, wherein the fault control switch is turned on to correspond to a fault control signal input from a user.

5. The method of claim 4, wherein injecting the fault comprises changing an output waveform of the converted voltage based on a fault injection output interface whenever the fault control switch is turned on.

6. The method of claim 5, wherein injecting the fault comprises changing the output waveform to correspond to a preset fault waveform parameter.

7. An apparatus for fault injection with a variable power supply, comprising:

a voltage converter for controlling a voltage level of an external voltage;

an output control switch for controlling output of a converted voltage output from the voltage converter; and a fault control switch for injecting a fault into the converted voltage.

8. The apparatus of claim 7, wherein the converted voltage into which the fault is injected is supplied to a fault injection target device.

9. The apparatus of claim 7, wherein the voltage converter converts the external voltage to correspond to a variable voltage control signal input from a user, thereby outputting the converted voltage.

10. The apparatus of claim 7, wherein the fault control switch is turned on to correspond to a fault control signal input from a user.

11. The apparatus of claim 10, wherein, whenever the fault control switch is turned on, an output waveform of the converted voltage is changed based on a fault injection output interface.

12. The apparatus of claim 11, wherein the output waveform is changed to correspond to a preset fault waveform parameter.

13. A method for fault injection with a variable power supply, performed by a fault injection apparatus, comprising:

determining whether an external voltage is supplied;

controlling a voltage level of the external voltage using a voltage converter when the external voltage is supplied;

controlling output of a converted voltage, output from the voltage converter, using an output control switch; and injecting a fault into the converted voltage using a fault control switch.

14. The method of claim 13, further comprising:

when the external voltage is not supplied, interrupting, by the fault injection apparatus, output of a voltage through the output control switch and performing, by the fault injection apparatus, only fault injection through a voltage line of a fault injection target device.

15. The method of claim 13, further comprising:

supplying, by the fault injection apparatus, the converted voltage into which the fault is injected to a fault injection target device.

16. The method of claim 13, wherein the voltage converter converts the external voltage to correspond to a variable voltage control signal input from a user, thereby outputting the converted voltage.

17. The method of claim 13, wherein the fault control switch is turned on to correspond to a fault control signal input from a user.

18. The method of claim 17, wherein injecting the fault comprises changing an output waveform of the converted voltage based on a fault injection output interface whenever the fault control switch is turned on.

19. The method of claim 18, wherein injecting the fault comprises changing the output waveform to correspond to a preset fault waveform parameter.

* * * * *